United States Patent
Kameda et al.

(10) Patent No.: US 8,324,788 B2
(45) Date of Patent: Dec. 4, 2012

(54) PIEZOELECTRIC POWER GENERATOR

(75) Inventors: Eitaro Kameda, Kyoto-Fu (JP);
Toshiaki Yamashita, Kyoto-Fu (JP)

(73) Assignee: Murata Manufacturing Co., Ltd., Nagaokakyo-Shi, Kyoto-fu (JP)

( * ) Notice: Subject to any disclaimer, the term of this patent is extended or adjusted under 35 U.S.C. 154(b) by 0 days.

(21) Appl. No.: 13/251,314

(22) Filed: Oct. 3, 2011

(65) Prior Publication Data

US 2012/0043856 A1 Feb. 23, 2012

Related U.S. Application Data

(63) Continuation of application No. PCT/JP2010/051323, filed on Feb. 1, 2010.

(30) Foreign Application Priority Data

Apr. 15, 2009 (JP) .................................. 2009-098789

(51) Int. Cl.
*H02N 2/00* (2006.01)
*H01L 41/08* (2006.01)

(52) U.S. Cl. ........................ 310/339; 310/330

(58) Field of Classification Search .................. 310/339, 310/330–332, 329, 324, 328, 353, 354, 348, 310/345, 311, 314; 73/146.6, 146.5; *H02N 2/00;* *H01L 41/08*
See application file for complete search history.

(56) References Cited

U.S. PATENT DOCUMENTS

| | | | |
|---|---|---|---|
| 7,415,874 B2 | 8/2008 | Mancosu et al. | |
| 8,174,168 B2 * | 5/2012 | Nakamura et al. | 310/339 |
| 2007/0295069 A1 * | 12/2007 | Mancosu et al. | 73/146 |
| 2011/0023592 A1 * | 2/2011 | Hortig et al. | 310/339 |
| 2011/0227456 A1 * | 9/2011 | Horiguchi | 310/339 |

FOREIGN PATENT DOCUMENTS

| | | |
|---|---|---|
| JP | 2005-312269 A | 11/2005 |
| JP | 2007-527681 | 9/2007 |
| JP | 2008-54450 A | 3/2008 |

OTHER PUBLICATIONS

PCT/JP2010/051323 Copy of Written Opinion dated Mar. 25, 2010.

* cited by examiner

*Primary Examiner* — Thomas Dougherty
*Assistant Examiner* — Karen B Addison
(74) *Attorney, Agent, or Firm* — Dickstein Shapiro LLP

(57) ABSTRACT

A piezoelectric power generator having a first elastic body which deforms along a first direction when subject to a stress, and a power-generating element. The power-generating element includes a second elastic body and a piezoelectric element. The second elastic body includes a fixing portion and an abutting portion. The fixing portion is fixed to the first elastic body. The abutting portion is arranged on one side in a first direction with respect to the fixing portion. The abutting portion abuts against the first elastic body, but is not fixed to the first elastic body. At least one of the first elastic body and the second elastic body is provided with a slippage suppression mechanism that suppresses slipping of the abutting portion with respect to the first elastic body when the first elastic body is deformed.

20 Claims, 10 Drawing Sheets

PIEZOELECTRIC POWER GENERATOR

CROSS REFERENCE TO RELATED APPLICATIONS

The present application is a continuation of International Application No. PCT/JP2010/051323, filed Feb. 1, 2010, which claims priority to Japanese Patent Application No. 2009-098789, filed Apr. 15, 2009, the entire contents of each being incorporated herein by reference.

FIELD OF THE INVENTION

The present invention relates to piezoelectric power generators and more specifically relates to piezoelectric power generators equipped with a power-generating element having a unimorph structure.

BACKGROUND OF THE INVENTION

Known examples of conventional systems that detect the air pressure of for example a tire of an automobile include a tire air pressure monitoring system (Tire Pressure Monitoring System: TPMS). In general, a TPMS is attached to the inside of a tire and is equipped with a sensor, which detects the air pressure and temperature of the tire, and a transmitter, which wirelessly transmits data to a transceiver located in the vehicle. Accordingly, in a TPMS, it is necessary that there be a power source for supplying electric power to the sensor and the transmitter for example.

A variety of power generators have been proposed to date as power sources that can be used in TPMS's and the like. Among these power generators, in particular, piezoelectric power generators that utilize the piezoelectric effect have been the focus of much attention since this kind of power generator can be easily reduced in size.

For example, the piezoelectric power generator illustrated in FIG. 24 is described in below-cited Patent Literature 1. As illustrated in FIG. 24, a piezoelectric power generator 100 includes an elastic body 102 that has an end portion on one side thereof fixed in place and has a weight 101 attached to an end portion on the other side thereof. Contacts 103 and 104 are provided on main surfaces 102a and 102b of the elastic body 102. In addition, piezoelectric elements 105 and 106 are fixed onto the main surfaces 102a and 102b.

In the piezoelectric power generator 100, when the elastic body 102 is displaced in the upward direction due to a stress being applied to the weight 101, the contact 103 applies a pressure to the piezoelectric element 105. As a result, the piezoelectric element 105 is deformed and power is generated in the piezoelectric element 105. Furthermore, when the elastic body 102 is displaced in the downward direction due to a stress being applied to the weight 101, the contact 104 applies a pressure to the piezoelectric element 106. As a result, the piezoelectric element 106 is deformed and power is generated in the piezoelectric element 106.

Patent Literature 1: Japanese Unexamined Patent Application Publication No. 2005-312269

SUMMARY OF THE INVENTION

In the piezoelectric power generator 100 illustrated in FIG. 24, when the piezoelectric elements 105 and 106 are deformed due to being subject to a pressure by the contacts 103 and 104, a tensile stress is applied to piezoelectric bodies 105a and 106a of the piezoelectric elements 105 and 106. The piezoelectric bodies 105a and 106a are susceptible to tensile stress and are easily damaged when subject to a tensile stress. Therefore, it has been difficult to realize high durability for the piezoelectric power generator 100.

Furthermore, in the piezoelectric power generator 100, there has been a problem in that it has been difficult to obtain a sufficiently high power generation efficiency.

In view of the above-described points, an object of the present invention is to provide a piezoelectric power generator that has high durability and high power generation efficiency.

A piezoelectric power generator according to the present invention includes a first elastic body and a power-generating element. The first elastic body deforms along a first direction when subject to a stress. The power-generating element includes a second elastic body and a piezoelectric element. The second elastic body includes a fixing portion and an abutting portion. The fixing portion is fixed to the first elastic body. The abutting portion is arranged on one side in the first direction with respect to the fixing portion. The abutting portion abuts against the first elastic body, but is not fixed to the first elastic body. A piezoelectric element is attached to a surface of the second elastic body on the opposite side to that on which the first elastic body is disposed. At least one of the first elastic body and the second elastic body is provided with a slippage suppression mechanism that suppresses slipping of the abutting portion with respect to the first elastic body when the first elastic body is deformed.

In a certain specific aspect of the piezoelectric power generator according to the present invention, the abutting portion has an end surface that faces toward the one side in the first direction. The slippage suppression mechanism is a stopper that is fixed to the first elastic body so as to be positioned on the one side in the first direction with respect to the end surface of the abutting portion and that abuts against the end surface of the abutting portion when the first elastic body is deformed. With this configuration, slipping of the abutting portion with respect to the first elastic body can be more reliably suppressed. Consequently, it is possible for the second elastic body and the piezoelectric element, which is attached to the second elastic body, to be displaced by a greater amount. Therefore, the power generation efficiency can be further increased.

In another specific aspect of the piezoelectric power generator according to the present invention, a gap is formed between the stopper and the end surface of the abutting portion when the surface of the first elastic body, to which the second elastic body is attached, is flat. With this configuration, deforming of the second elastic body into a convex shape as a result of the second elastic body being caught by the stopper is prevented when the first elastic body is deformed into a convex shape toward the second elastic body side. Therefore, application of tensile stress to the piezoelectric element, which is attached to a side of the second elastic body opposite to that on which the first elastic body is disposed, can be more reliably suppressed. As a result, higher durability can be realized.

In another specific aspect of the piezoelectric power generator according to the present invention, at least one surface out of a surface of the abutting portion on the first elastic body side and a surface of the first elastic body that abuts against the abutting portion is formed as a rough surface and the slippage suppression mechanism is formed of the rough surface. With this configuration, it is not necessary to provide a separate stopper and therefore the structure can be simplified.

In yet another specific aspect of the piezoelectric power generator according to the present invention, the fixing portion is connected to an end portion of the abutting portion on the other side in the first direction, and the slippage suppression mechanism is provided such that slipping of an end portion of the abutting portion on the one side in the first direction with respect to the first elastic body is suppressed. With this configuration, it is possible to cause the second elastic body and the piezoelectric element, which is attached to the second elastic body, to be deformed by a greater amount. Therefore, higher power generation efficiency can be realized.

In yet another specific aspect of the piezoelectric power generator according to the present invention, the second elastic body is formed of a single elastic plate, the fixing portion includes a first fixing portion that is arranged on the other side in the first direction with respect to the abutting portion, second and third fixing portions that are arranged at sides of the abutting portion, and a fourth fixing portion that is arranged on the one side in the first direction with respect to the abutting portion, and the stopper is formed of part of the fourth fixing portion. With this configuration, the second elastic body and the stopper can be fabricated more easily by using a single elastic plate.

In yet another specific aspect of the piezoelectric power generator according to the present invention, the first elastic body and the second elastic body are formed of a single elastic plate. With this configuration, it is possible to increase the strength of the joint between the first elastic body and the second elastic body. Therefore, when the second elastic body is deformed with deformation of the first elastic body, damaging of the joint between the first elastic body and the second elastic body can be suppressed. Therefore, it is possible to realize higher durability. In addition, with this configuration, manufacturing of the piezoelectric power generator is simple.

In the present invention, a slippage suppression mechanism that suppresses slipping of the abutting portion with respect to the first elastic body when the first elastic body is deformed is provided on at least one of the first elastic body and the second elastic body and therefore the second elastic body and the piezoelectric element are deformed by a greater amount with deformation of the first elastic body and therefore high power generation efficiency can be realized.

In addition, the abutting portion can be displaced with respect to the first elastic body and therefore even in the case where the first elastic body is deformed into a convex shape toward the second elastic body side, the second elastic body is not liable to be deformed into a convex shape toward the piezoelectric element side. Therefore, it is unlikely that tensile stress will be applied to the piezoelectric element and the durability of the piezoelectric element can be increased. Therefore, it is possible to realize high durability for the piezoelectric power generator.

DETAILED DESCRIPTION OF THE INVENTION

Figure 1:
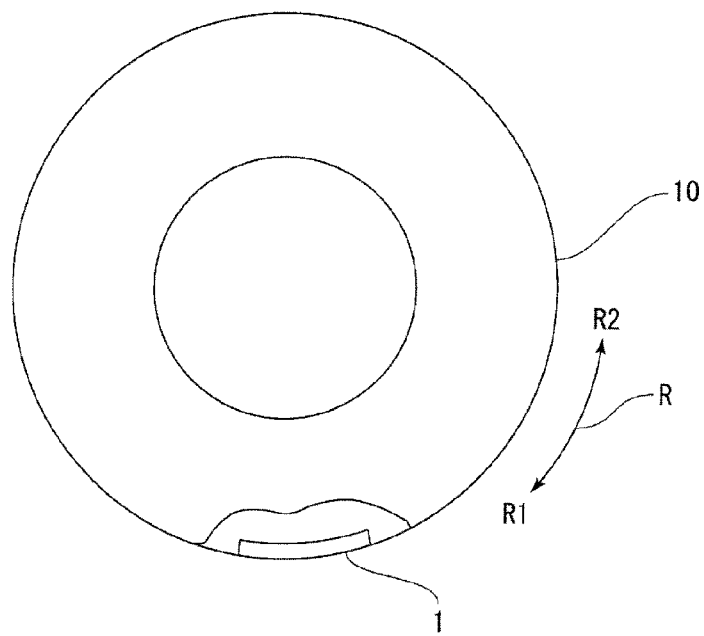
FIG. 1 is a schematic partial sectional view of a tire to which a piezoelectric power generator of a first embodiment has been attached.

Hereafter, the present invention will be made clear by describing specific embodiments of the present invention while referring to the drawings.

(First Embodiment)

In this embodiment, description will be made of a case in which a piezoelectric power generator is arranged inside a tire and is used by a TPMS. However, applications of piezoelectric power generators of the present invention are not limited to being used by a TPMS. A piezoelectric power generator of the present invention can be applied to any application including a TPMS. A piezoelectric power generator of the present invention can be also used in applications such as ID tags and IC cards.

Figure 2:
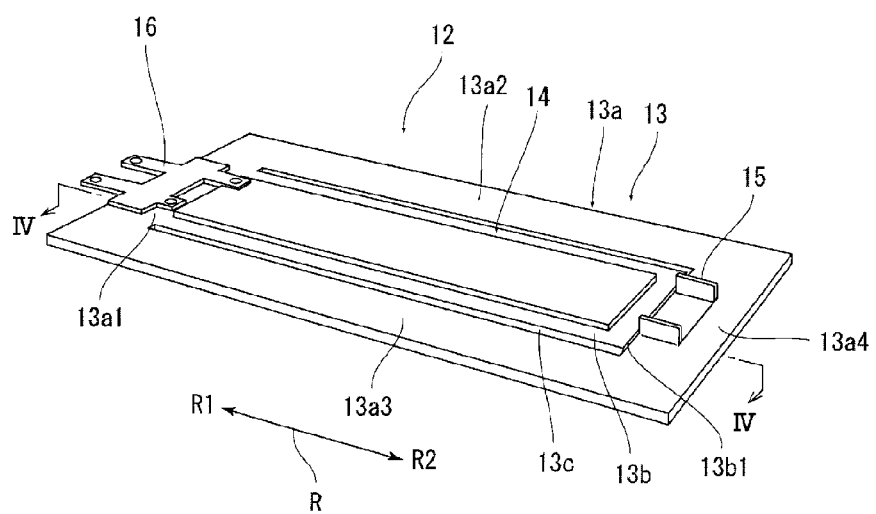
FIG. 2 is a schematic perspective view illustrating part of the piezoelectric power generator according to the first embodiment.
Figure 3:
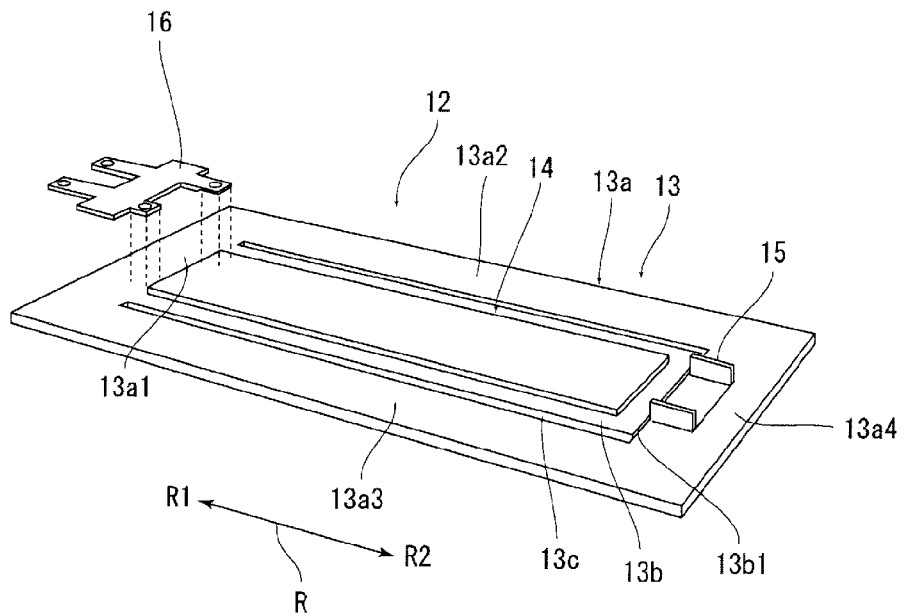
FIG. 3 is a schematic exploded perspective view illustrating part of the piezoelectric power generator according to the first embodiment.
Figure 4:
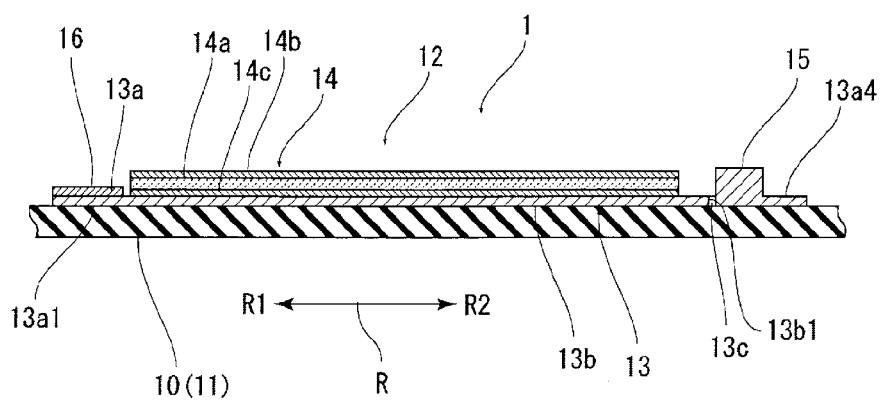
FIG. 4 is a view taken along arrows IV-IV in FIG. 2.

FIG. 1 is a schematic partial sectional view of a tire to which the piezoelectric power generator of this embodiment has been attached. FIG. 2 is a schematic perspective view illustrating part of the piezoelectric power generator according to the first embodiment. FIG. 3 is a schematic exploded perspective view illustrating part of the piezoelectric power generator according to the first embodiment. FIG. 4 is a schematic sectional view of the piezoelectric power generator according to the first embodiment.

As illustrated in FIG. 1, a piezoelectric power generator 1 of this embodiment is provided inside a tire 10. As illustrated in FIG. 4, the piezoelectric power generator 1 includes a first elastic body 11 that is formed of part of the tire 10, which is made of rubber. The tire 10 rotates and the portion of the tire 10 that is in contact with the ground changes, whereby the first elastic body 11 receives a stress and is deformed along a direction of rotation R of the tire 10, which is a first direction (also refer to FIG. 1).

In this embodiment, a case is described in which the first elastic body 11 is formed of part of the tire 10, but the first elastic body may be provided so as to be separate from the tire.

In addition, in the present invention, the term "elastic body" refers to a member that elastically deforms when subject to a stress, and specifically for example refers to a member that is formed of a rubber, a metal or a plastic.

A power-generating element 12 is attached to the top of the first elastic body 11. The power-generating element 12 includes a plate-shaped second elastic body 13 and a piezoelectric element 14. The second elastic body 13 can be for example formed of a metal, a plastic or a rubber.

The second elastic body 13 includes a fixing portion 13a and an abutting portion 13b. The second elastic body 13 is fixed to the first elastic body 11 at the fixing portion 13a. The method of fixing the fixing portion 13a to the first elastic body 11 is not particularly limited. The fixing portion 13a for example can be fixed to the first elastic body 11 through an adhesive, adhesive tape, a fastening member such as a bolt, a rivet or a welding inlay mechanism.

As illustrated in FIG. 2 and FIG. 3, the fixing portion 13a includes a first fixing portion 13a1, a second fixing portion 13a2, a third fixing portion 13a3 and a fourth fixing portion 13a4. The first fixing portion 13a1 is positioned on an R1-side in the direction of rotation R with respect to the abutting portion 13b. The first fixing portion 13a1 is connected to the abutting portion 13b. The second and third fixing portions 13a2 and 13a3 are positioned on either side of the abutting portion 13b. That is, the second and third fixing portions 13a2 and 13a3, and the abutting portion 13b are arranged in a direction that is perpendicular to the direction of rotation R. The second and third fixing portions 13a2 and 13a3 are connected to the first fixing portion 13a1. The fourth fixing portion 13a4 is positioned on an R2-side in the direction of rotation R with respect to the abutting portion 13b. The fourth fixing portion 13a4 is connected to the second and third fixing portions 13a2 and 13a3.

In this embodiment, the first to fourth fixing portions 13a1 to 13a4 and the abutting portion 13b are formed from a single elastic plate and the second to fourth fixing portions 13a2 to 13a4 and the abutting portion 13b are partitioned from each other by a slit 13c. That is, the abutting portion 13b is capable of being displaced relative to the second to fourth fixing portions 13a2 to 13a4.

The abutting portion 13b is positioned on the R2 side in the direction of rotation R with respect to the first fixing portion 13a1 and is connected to the first fixing portion 13a1. The abutting portion 13b is formed in a rectangular shape that extends toward the R2 side in the direction of rotation R from the first fixing portion 13a1. The abutting portion 13b is not fixed to the first elastic body 11, but abuts against the first elastic body 11.

In this embodiment, an example is described in which the entirety of the second elastic body 13 except for the fixing portion 13a forms the abutting portion 13b, but the abutting portion 13b may instead be formed of a part of a portion of the second elastic body 13 excluding the fixing portion 13a.

The piezoelectric element 14 is attached to the surface of the abutting portion 13b on the opposite side to that on which the first elastic body 11 is disposed. In this embodiment, the piezoelectric element 14 is attached to a central portion of the abutting portion 13b excluding a periphery portion of the abutting portion 13b, but the piezoelectric element 14 may be attached over the entirety of the abutting portion 13b.

As illustrated in FIG. 4, the piezoelectric element 14 includes a piezoelectric body 14a and first and second electrodes 14b and 14c that sandwich the piezoelectric body 14a therebetween. The first and second electrodes 14b and 14c are connected to a terminal electrode 16. Power generated in the piezoelectric element 14 is extracted from this terminal electrode 16. There is a conductive portion that is connected to the first electrode 14b and a conductive portion that is connected to the second electrode 14c on the terminal electrode 16 and these conductive portions are insulated from each other, but these conductive portions have not been drawn in detail in order to simplify the drawings.

The piezoelectric body 14a is typically polarized in the thickness direction thereof. However, the polarization direction of the piezoelectric body 14a does not have to be the thickness direction and the piezoelectric body 14a may be for example polarized in the widthwise direction or lengthwise direction thereof. In addition, the material used to form the piezoelectric body 14a is not particularly limited and the piezoelectric body 14a can be for example formed of a suitable piezoelectric material such as lead zirconate titanate (PZT), $LiTaO_3$, $LiNbO_3$ or quartz.

The material used to form the first and second electrodes 14b and 14c is not particularly limited and the first and second electrodes 14b and 14c can for example be formed of a metal such as iron, copper or aluminum or an alloy such as stainless steel or duralumin.

As illustrated in FIGS. 2 to 4, in this embodiment, a stopper 15 is provided on the second elastic body 13 as a slippage suppression mechanism. The stopper 15 suppresses slipping of the abutting portion 13b relative to the first elastic body 11 when the first elastic body 11 is deformed along the direction of rotation R due to a stress being applied to the elastic body 11 as a result of the rotation of the tire 10.

Specifically, as illustrated in FIG. 4, the abutting portion 13b has an end surface 13b1 that faces toward the R2-side in the direction of rotation R and the stopper 15 is formed of part of the fourth fixing portion 13a4, which is positioned on the R2-side of the end surface 13b1 of the abutting portion 13b. Specifically, the stopper 15 is formed by bending R1-side end portions of the fourth fixing portion 13a4 so that they point in a direction normal to the abutting portion 13b. Thus, in this embodiment, since the stopper 15 is formed of part of the fourth fixing portion 13a4, the stopper 15, the fixing portion 13a and the abutting portion 13b can be easily fabricated from a single elastic plate.

Figure 5:
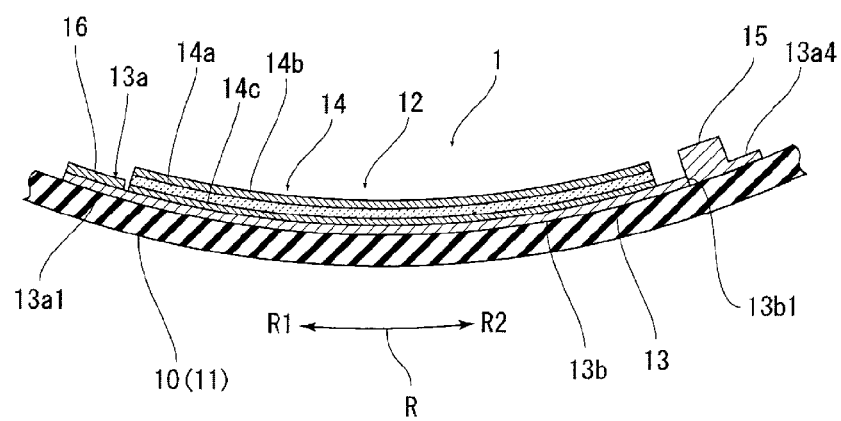
FIG. 5 is a schematic sectional view of a piezoelectric power generator in a state in which a first elastic body is curved into a concave shape.

As illustrated in FIG. 4, in this embodiment, when the surface of a portion of the first elastic body 11 to which the second elastic body 13 has been attached is flat, a gap is formed between the stopper 15 and the abutting portion 13b. Whereas, as illustrated in FIG. 5, when the first elastic body 11 has a concave shape, an R2-side end portion of the abutting portion 13b abuts against the stopper 15.

Figure 6:
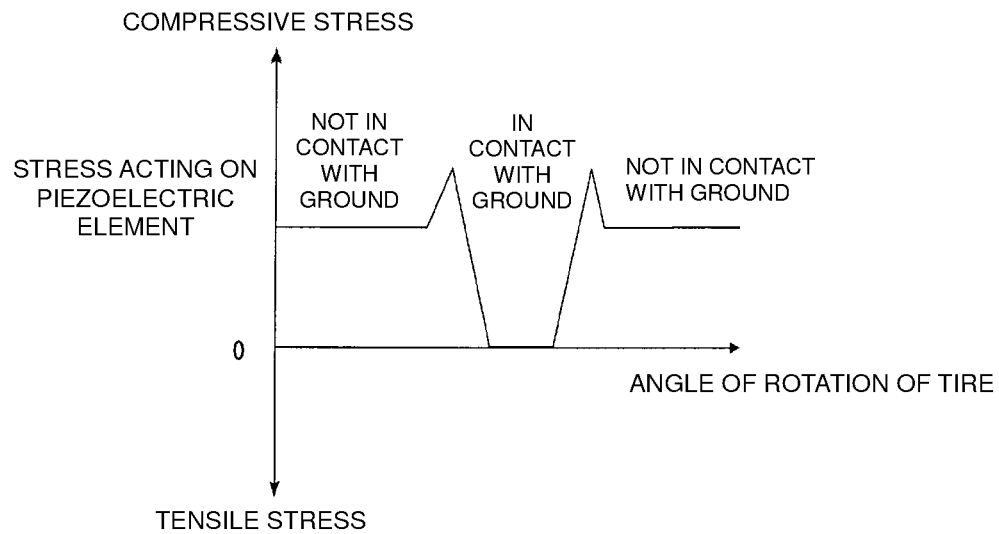
FIG. 6 is a graph illustrating stress acting on the piezoelectric element with respect to rotation of the tire.

Next, the power generating operation of the piezoelectric power generator 1 will be described while mainly referring to FIG. 6. In a state in which the first elastic body 11, which is a portion of the tire 10 to which the second elastic body 13 is attached, is not in contact with the ground, as illustrated in FIG. 5, the first and second elastic bodies 11 and 13 are in a concave shape facing outward in the radial direction. When the tire 10 rotates from this state and the first elastic body 11 begins to come into contact with the ground, a stress is applied to the first elastic body 11 and the curvature of the first and second elastic bodies 11 and 13 becomes smaller. Consequently, the piezoelectric body 14a of the piezoelectric element 14 attached to the second elastic body 13 is deformed. As a result, power is generated. When the first elastic body 11 is completely in contact with the ground, as illustrated in FIG. 4, the surfaces of the first and second elastic bodies 11 and 13 are flat. Then, when the first elastic body 11 starts to move away from the ground, the first and second elastic bodies 11 and 13 are again deformed into a concave shape. Consequently, the piezoelectric body 14a is deformed and power is generated. Power generation is performed by this action repeatedly occurring.

Figure 7:
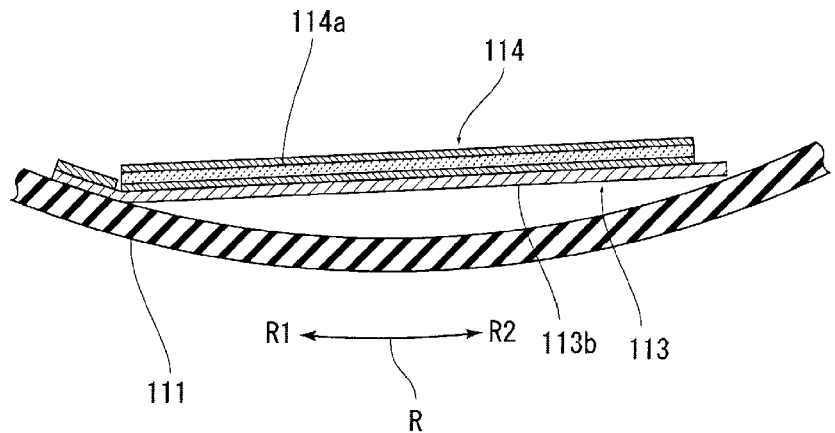
FIG. 7 is a schematic sectional view for explaining a case in which a stopper is not provided.

Here, for example, in the case where the stopper 15 is not provided, as illustrated in FIG. 7, even though a first elastic body 111 deforms, an abutting portion 113b of a second elastic body 113 slips with respect to the first elastic body 111. Consequently, the shape of the second elastic body 113 does not change in line with the change in shape of the first elastic body 111. Therefore, a piezoelectric body 114a of a piezoelectric element 114, which is attached to the second elastic body 113, does not deform by a large amount. Consequently, a large amount of power cannot be obtained and the power generation efficiency is low.

In contrast, in this embodiment, as illustrated in FIG. 4, the stopper 15 is provided. Accordingly, as illustrated in FIG. 5, when the first elastic body 11 is deformed, the R2-side end surface 13b1 of the abutting portion 13b abuts against the stopper 15, which is indirectly fixed to the first elastic body 11. Therefore, slipping of the R2-side end surface 13b1 of the abutting portion 13b with respect to the first elastic body 11 is suppressed. Therefore, the second elastic body 13 and the piezoelectric body 14a of the piezoelectric element 14, which is attached to the second elastic body 13, are deformed by a large amount. As a result, a large amount of power can be obtained with deformation of the first elastic body 11 and a high power generation efficiency can be realized.

In particular, in this embodiment, the R1-side end portion of the abutting portion 13b is connected to the first fixing portion 13a1 and is thereby fixed to the first elastic body 11 and slipping of the R2-side end portion of the abutting portion 13b with respect to the first elastic body 11 is suppressed by the stopper 15. Therefore, the second elastic body 13 and the piezoelectric body 14a of the piezoelectric element 14, which is attached to the second elastic body 13, are deformed by a larger amount with deformation of the first elastic body 11. As a result, a large amount of power can be obtained with deformation of the first elastic body 11 and a higher power generation efficiency can be realized.

As another method of making the second elastic body be deformed by a large amount with deformation of the first elastic body, affixing of the abutting portion to the first elastic body can be considered. However, when the abutting portion is affixed to the first elastic body, for example in the case where the first elastic body is deformed into a convex shape toward the inside in the radial direction, due to the tire rolling over a stone or the like and becoming dented, the second elastic body is also deformed into a convex shape toward the inside in the radial direction. When this happens, the piezoelectric body of the piezoelectric element, which is attached to the top of the second elastic body, is also deformed into a convex shape and a tensile stress acts on the piezoelectric body. Since piezoelectric bodies have low durability to tensile stress, sometimes they will be damaged if they are subject to a tensile stress in this way. Therefore, in the case where the abutting portion is affixed to the first elastic body, the durability of the piezoelectric power generator will be low.

Figure 8:
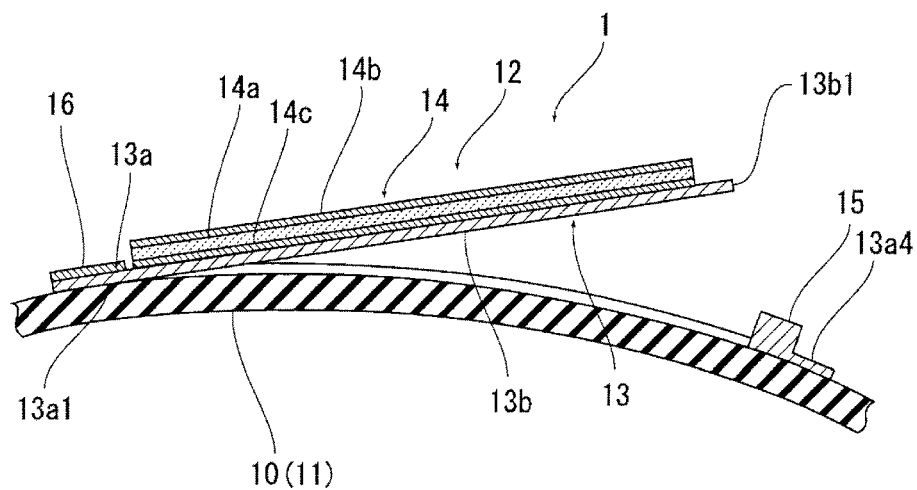
FIG. 8 is a schematic sectional view for explaining a case where the first elastic body is deformed into a convex shape in the first embodiment.

In contrast, in this embodiment, the abutting portion 13b to which the piezoelectric element 14 is attached, is not directly affixed to the first elastic body 11, but rather is fixed to the first elastic body 11 via the first fixing portion 13a1. Consequently, as illustrated in FIG. 8, even when the tire 10 rolls over a stone or the like and as a result the first elastic body 11 is deformed into a convex shape toward the inside in the radial direction, since the second elastic body 13 is not restrained by the first elastic body 11, deforming of the second elastic body 13 into a convex shape is effectively suppressed. Therefore, deforming of the piezoelectric body 14a of the piezoelectric element 14, which is attached to the second elastic body 13, into a convex shape is also effectively suppressed and the application of tensile stress to the piezoelectric body 14a is effectively suppressed. Therefore, high durability is realized.

In this embodiment, as illustrated in FIG. 4, the stopper 15 is provided in such a manner that a gap is formed between the stopper 15 and the end surface 13b1 of the abutting portion 13b when the surface of the first elastic body 11 is flat. Consequently, when the first elastic body 11 is deformed in such a manner as to have a convex shape toward the inside in the radial direction, the leading end portion of the abutting portion 13b is not restrained by the stopper 15. Therefore, deforming of the abutting portion 13b into a convex shape toward the inside in the radial direction is effectively suppressed. As a result, a higher durability is realized.

In addition, from the viewpoint of realizing higher durability, as in this embodiment, it is preferable that the piezoelectric element 14 not be attached to the fixing portion 13a, but rather be attached to the abutting portion 13b.

Hereafter, another example of a preferred mode of carrying out the present invention will be described. In the following description, components having substantially the same functions as those of the above-described first embodiment are denoted by the same symbols and description thereof is omitted.

(Second Embodiment)

In the first embodiment, an example was described in which the first elastic body 11 is formed of part of the tire 10. However, the present invention is not limited to this configuration. The first elastic body 11 may be formed of a member that is separate from the tire 10. In this embodiment, an example in which the first elastic body 11 is formed of a member that is separate from the tire 10 will be described while referring to FIG. 9.

Figure 9:
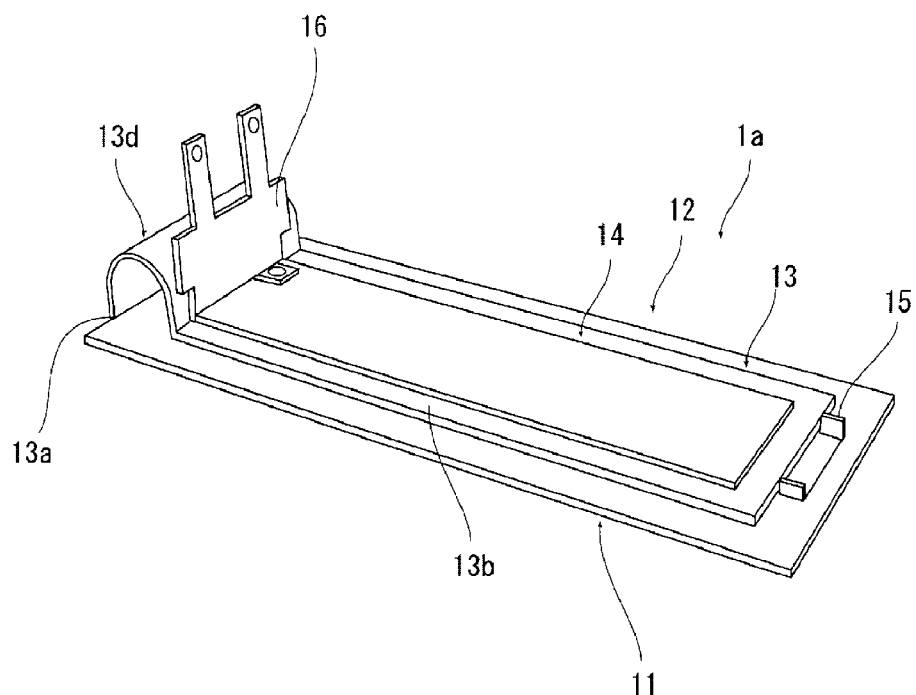
FIG. 9 is a schematic perspective view of a piezoelectric power generator according to a second embodiment.

As illustrated in FIG. 9, in a piezoelectric power generator 1a according to a second embodiment, the first elastic body 11 is formed of an elastic plate that is separate from the tire 10. Specifically, the first elastic body 11 and the second elastic body 13 are formed of a single elastic plate such as a metal plate. The piezoelectric power generator 1a of this embodiment is used by affixing the first elastic body 11 to the inside of the tire 10.

In this embodiment, the second elastic body 13 includes the abutting portion 13b, which is a flat plate and to which the piezoelectric element 14 is attached, and a curved portion 13d that connects the abutting portion 13b and the first elastic body 11 and has an upwardly facing convex shape. A leading end portion of the curved portion 13d forms the fixing portion 13a, which is fixed to the first elastic body 11.

In this way, in this embodiment, since the first elastic body 11 and the second elastic body 13 are formed of a single elastic plate, the strength of the joint between the first elastic body 11 and the second elastic body 13 can be increased. Therefore, it is possible to realize higher durability.

In addition, in this embodiment, the curved portion 13d is provided between the abutting portion 13b and the first elastic body 11. Consequently, when a stress is applied to the piezoelectric power generator 1a and the first and second elastic bodies 11 and 13 are deformed, the stress acting on the joint between the first elastic body 11 and the abutting portion 13b is mitigated by the deformation of the curved portion 13d. Therefore, damaging the joint between the first elastic body 11 and the abutting portion 13b can be effectively suppressed.

(Third Embodiment)

Figure 10:
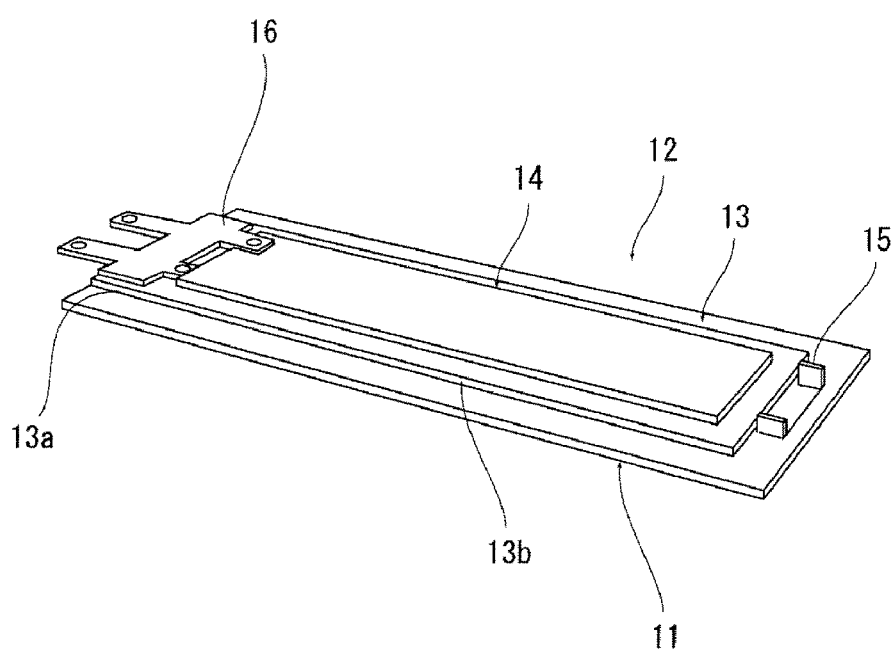
FIG. 10 is a schematic perspective view of a piezoelectric power generator according to a third embodiment.
Figure 11:
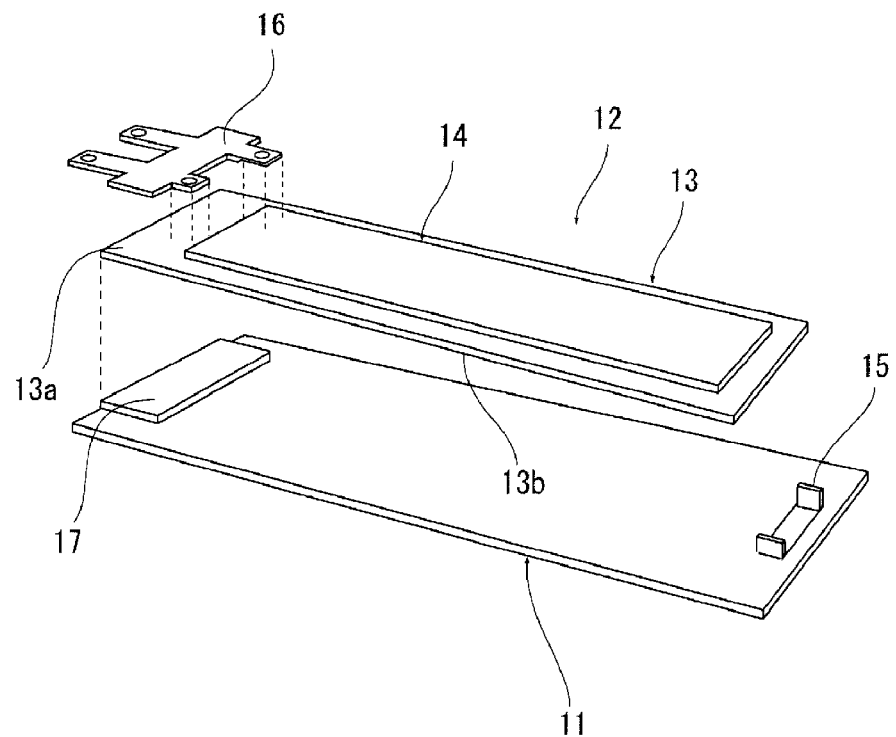
FIG. 11 is a schematic exploded perspective view of the piezoelectric power generator according to the third embodiment.

In the above-described second embodiment, a case was described in which the first elastic body 11 and the second elastic body 13 are formed in an integrated manner. However, the present invention is not limited to this configuration. For example, as illustrated in FIG. 10 and FIG. 11, the first elastic body 11 and the second elastic body 13 may be formed of separate elastic plates. In this case, the first elastic body 11 and the second elastic body 13 for example can be joined to each other using adhesive tape 17 as illustrated in FIG. 11.

However, the method of joining the first elastic body 11 and the second elastic body 13 to each other is not limited to this. For example, the first elastic body 11 and the second elastic body 13 may be joined to each other by using an adhesive, a fastening member such as a screw or a bolt, or a rivet. In addition, in the case where each of the first elastic body 11 and the second elastic body 13 is a metal plate, the first elastic body 11 and the second elastic body 13 may be joined to each other by welding.

(Fourth Embodiment)

Figure 12:
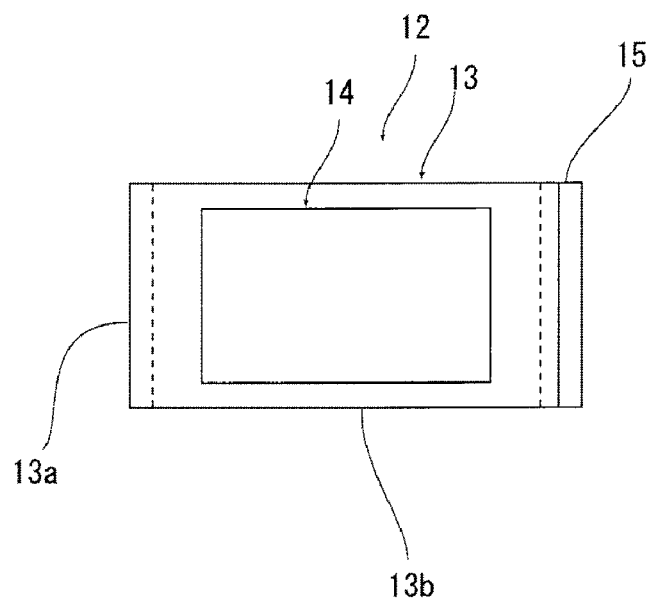
FIG. 12 is a schematic plan view of a piezoelectric power generator according to a fourth embodiment.
Figure 13:
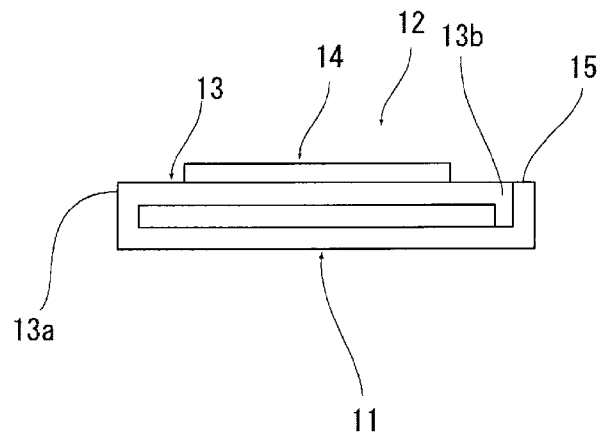
FIG. 13 is a schematic side view of the piezoelectric power generator according to the fourth embodiment.

FIG. 12 and FIG. 13 are respectively a schematic plan view and a schematic side view of a piezoelectric power generator according to a fourth embodiment.

As illustrated in FIG. 12 and FIG. 13, the first elastic body 11, the second elastic body 13 and the stopper 15 are formed in an integrated manner by bending a single rectangular elastic plate. Consequently, the piezoelectric power generator according to this embodiment is easy to manufacture and has high durability.

In FIG. 12 and FIG. 13, the second elastic body 13 and the stopper 15 are in contact with each other when the second elastic body 13 has a flat shape, but similarly to as in the first embodiment a configuration may be adopted in which a gap is formed between the second elastic body 13 and the stopper 15 when the second elastic body 13 has a flat shape.

(Fifth Embodiment)

Figure 14:
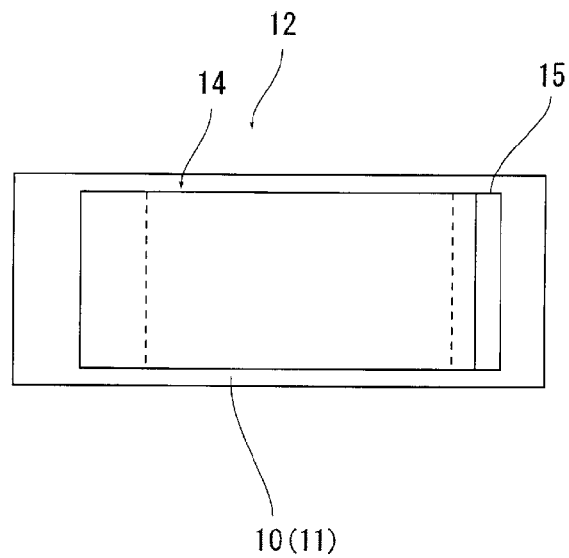
FIG. 14 is a schematic plan view of a piezoelectric power generator according to a fifth embodiment.
Figure 15:
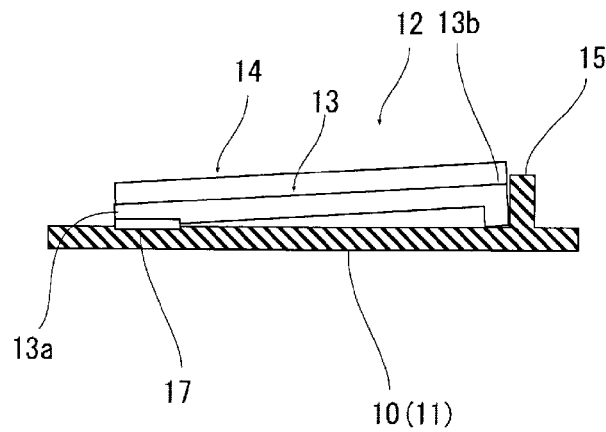
FIG. 15 is a schematic side view of the piezoelectric power generator according to the fifth embodiment.

In the first embodiment, an example was described in which the stopper 15 is fixed to the first elastic body 11 via the fixing portion 13a. However, the stopper 15 may instead be directly attached to the first elastic body 11. Furthermore, as illustrated in FIG. 14 and FIG. 15, the stopper 15 may be formed so as to be integrated with the first elastic body 11. In the example illustrated FIG. 14 and FIG. 15, specifically, together with the first elastic body 11 being formed of a portion of the tire 10, the stopper 15 is formed of a protrusion formed on the inner side of the tire 10.

(Sixth Embodiment)

Figure 16:
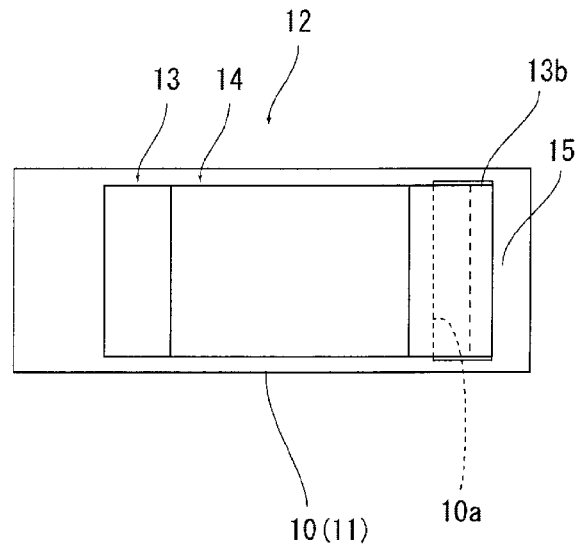
FIG. 16 is a schematic plan view of a piezoelectric power generator according to a sixth embodiment.
Figure 17:
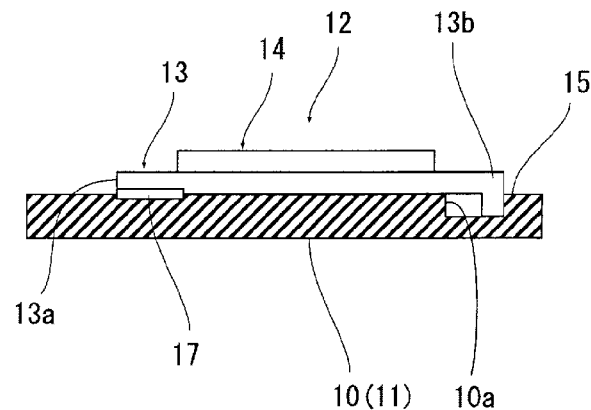
FIG. 17 is a schematic side view of the piezoelectric power generator according to the sixth embodiment.

In the above-described fifth embodiment, a case was described in which the stopper 15 is formed of a protrusion. However, the stopper 15 does not have to be a protrusion. For example, as illustrated in FIG. 16 and FIG. 17, the stopper 15 may be provided by forming a concave portion 10a in the tire 10.

In the first to sixth embodiments, examples were described in which the stopper 15 is provided on the R2-side of the leading end portion of the second elastic body 13. However, the position of the stopper 15 is not particularly limited so long as it is a position at which slipping of the abutting portion 13b with respect to the first elastic body 11 can be suppressed when the first elastic body 11 is deformed.

(Seventh Embodiment)

In the first to sixth embodiments, examples were described in which a slippage suppression mechanism is formed of a stopper. However, in the present invention, the slippage suppression mechanism is not limited to a stopper. In this embodiment, an example will be described in which the slippage suppression mechanism is formed of a rough surface.

Figure 18:
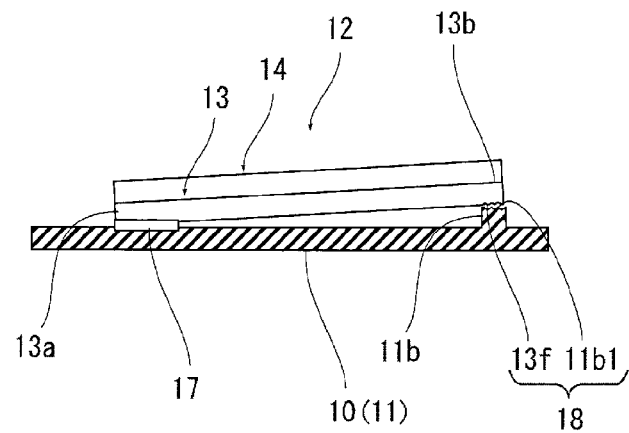
FIG. 18 is a schematic side view of a piezoelectric power generator according to a seventh embodiment.

As illustrated in FIG. 18, in this embodiment, a protrusion 11b is formed on a portion of the tire 10 that forms the first elastic body 11. A surface 11b1 on the top of the protrusion 11b that abuts against the second elastic body 13 is formed as a rough surface. In addition, a surface portion 13f of the second elastic body 13 that abuts against the top of the protrusion 11b is also formed as a rough surface. A slippage suppression mechanism 18 is formed of the surface 11b1 and the surface portion 13f, which are formed as rough surfaces. The slippage suppression mechanism 18 suppresses slipping of the abutting portion 13b of the second elastic body 13 with respect to the first elastic body 11 when the first elastic body 11 is deformed. Therefore, a high power generation efficiency can also be realized in this embodiment. Furthermore, even in the case where the first elastic body 11 is deformed into a convex shape, since the second elastic body 13 and the piezoelectric element 14, which is attached to the second elastic body 13, are not deformed into a convex shape, a high durability is realized. In addition, it is preferable that the roughness of the surface 11b1 be such that the maximum static frictional force generated at the plane of contact between the first elastic body 11 and the second elastic body 13 is larger than a component in a first direction of a force exerted on the second elastic body 13 as a result of deformation of the first elastic body 11 (a component, which is parallel to the plane of contact between the first elastic body 11 and the second elastic body 13, of a force that causes shifting of the plane of contact).

Here, the term "rough surface" means a surface that has been roughened so as have a higher surface roughness than surrounding portions to such a degree that slipping of the abutting portion 13b with respect to the first elastic body 11 when the first elastic body 11 is deformed is suppressed. For example, it is preferable that the surface roughness of the rough surface be a surface roughness that corresponds to number 1000 or less in terms of granularity defined by JIS R6010 and R6252, and it is further preferable that the surface roughness be a surface roughness that corresponds to number 180 or less. Furthermore, here, slipping is defined as a state in which a force parallel to the plane of abutment and acting between the first elastic body and the second elastic body exceeds the maximum static frictional force acting between the first elastic body and the second elastic body.

In the seventh embodiment, an example was described in which both the surface of the abutting portion 13b on the first elastic body 11 side and the surface of the first elastic body 11 that abuts against the abutting portion 13b are formed as rough surfaces. However, the present invention is not limited to this configuration. For example, just one of the surface of the abutting portion 13b on the first elastic body 11 side and the surface of the first elastic body 11 which abuts against the abutting portion 13b may be formed as a rough surface and the slippage suppression mechanism 18 may be formed of this rough surface. Furthermore, as another embodiment of the slippage suppression mechanism, although not illustrated in the drawings, it is also preferable that a rubber film or a resin film be provided on at least one of the abutting surfaces of the first elastic body and the second elastic body. Here, it is also preferable that a wavy pattern of grooves be formed in the surface of the rubber film or the resin film. In addition, the first direction does not have to be the direction of rotation and for example if the first elastic body has a rectangular shape such as in the case of an IC card, the first direction may be an linear direction in the plane of the rectangular shape and is preferably a linear direction that is parallel to the long sides of the rectangular shape.

EXPERIMENTAL EXAMPLES

The following experiments were performed to confirm the effect of providing the slippage suppression mechanism.

Figure 19:
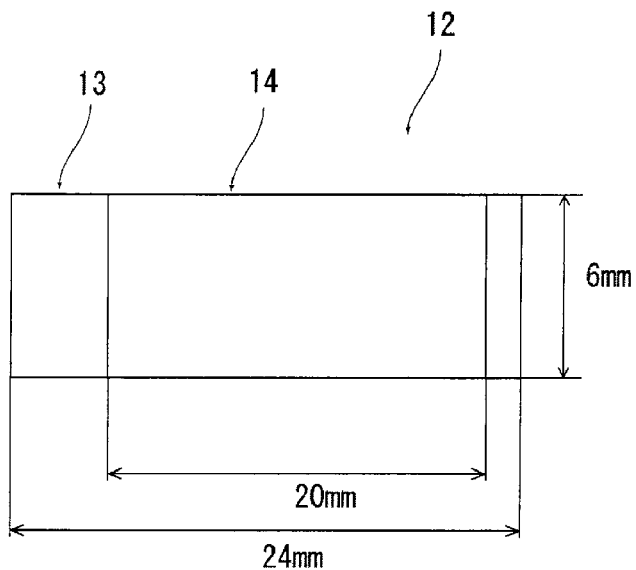
FIG. 19 is plan view of a power-generating element prepared in an experimental example.
Figure 20:
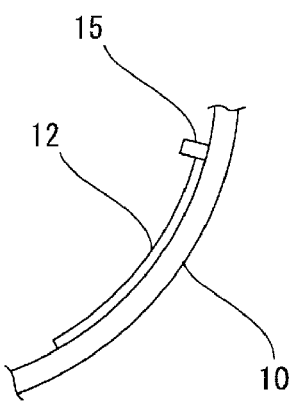
FIG. 20 is a schematic view of a piezoelectric power generator of a first experimental example.
Figure 21:
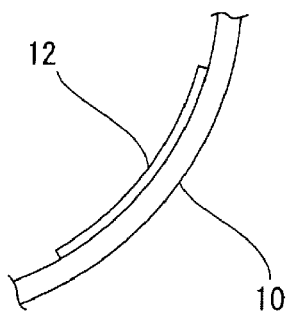
FIG. 21 is a schematic view of a piezoelectric power generator of a second experimental example.

First, the power-generating element 12 (capacitance: 7.3 nF), which is illustrated in FIG. 19, was prepared. Specifically, first, the piezoelectric element 14 was prepared by sandwiching a piezoelectric body composed of PZT and having a thickness of 0.2 mm between a pair of electrodes composed of NiCr/NiCu/Ag and having thicknesses of 0.15/0.15/0.30 µm. The dimensions of the piezoelectric element 14 were a length of 20 mm and a width of 5 mm. The preparation of the power-generating element 12 was completed by affixing the piezoelectric element 14 to the second elastic body 13 composed of Ni 42 and having a thickness of 0.2 mm, a length of 24 mm and a width of 6 mm.

In a first experimental example, one end portion of the power-generating element 12 is attached to the tire 10, to which the stopper 15 composed of Ni 42 is attached, such that the leading end portion of the second elastic body 13 abuts against the stopper 15. The dimensions of the stopper 15 were a thickness of 0.5 mm, a length of 1 mm and a width of 6 mm. The diameter of the tire 10 was 320 mm.

Figure 22:
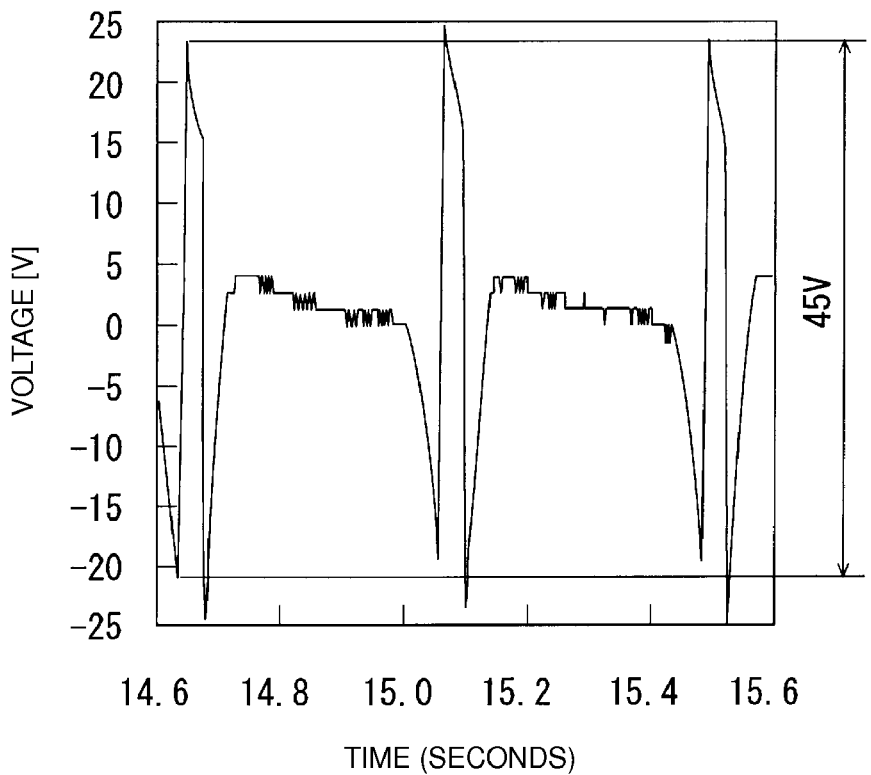
FIG. 22 is a graph illustrating the voltage generated by the piezoelectric power generator of the first experimental example.

Then, the voltage generated in the power-generating element was measured when the running speed of the automobile was 15 km/hr. The results are illustrated in FIG. 22.

A second experimental example was the same as the first experimental example except for the fact that the stopper 15 was not provided. The voltage generated in the power-generating element was measured when the running speed of the automobile was 15 km/hr. The results are illustrated in FIG. 23.

Figure 23:
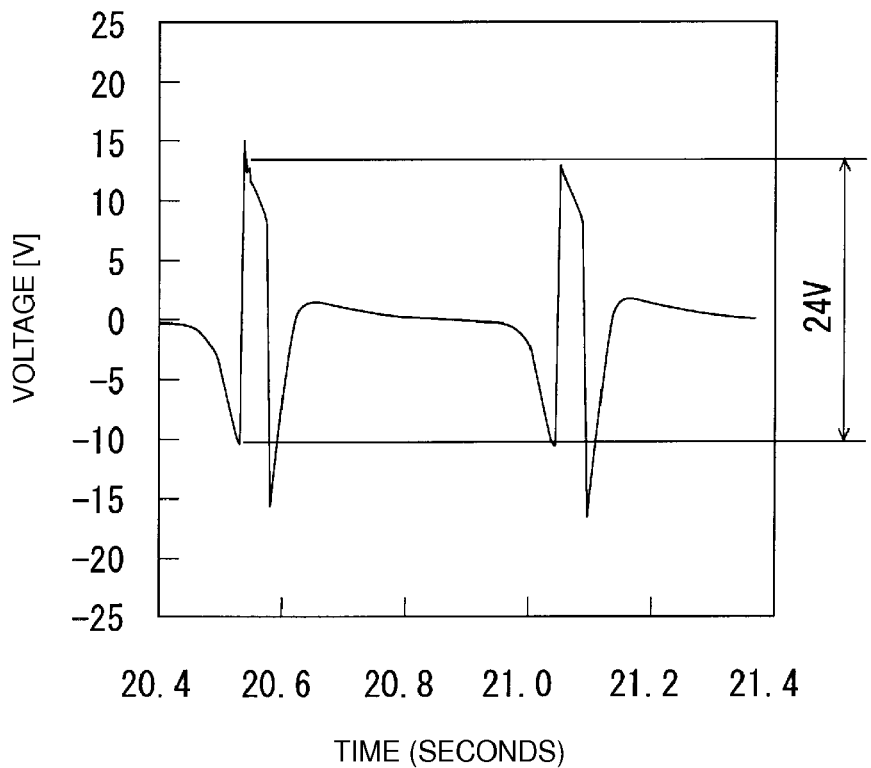
FIG. 23 is a graph illustrating the voltage generated by the piezoelectric power generator of the second experimental example.
Figure 24:
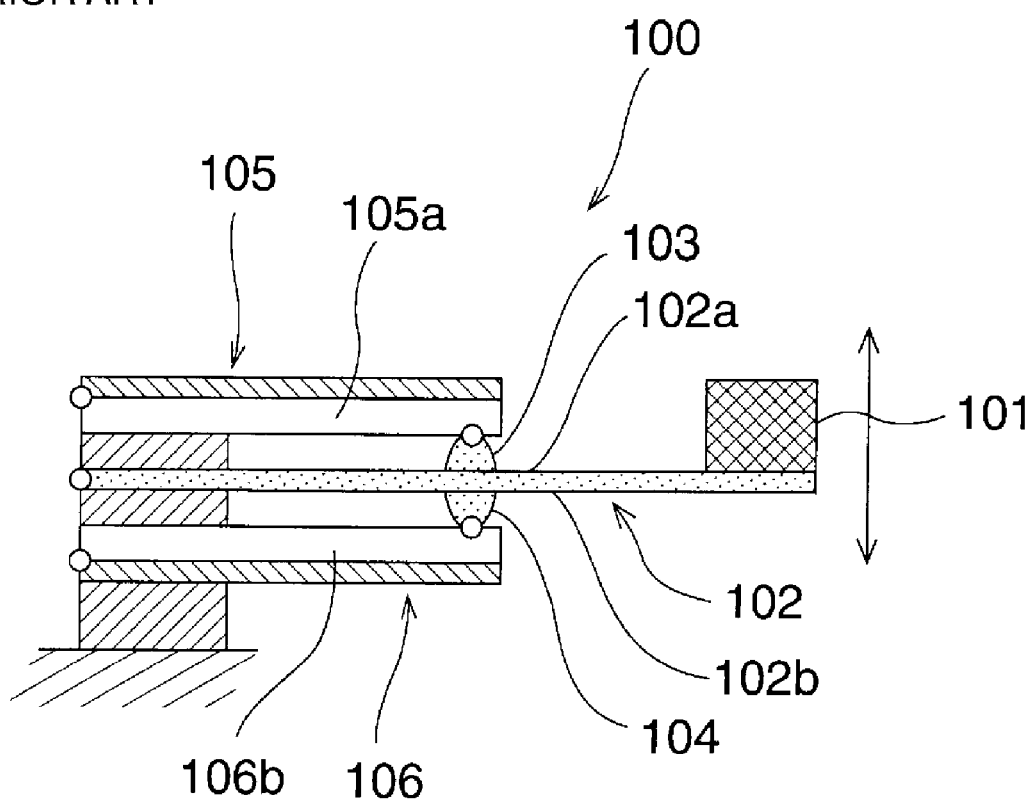
FIG. 24 is a schematic sectional view of a piezoelectric power generator described in Patent Literature 1.

In contrast to the second experimental example illustrated in FIG. 23 in which the stopper 15 was not provided and an electromotive force of about 24 V (5.3 micro joules of energy) was obtained, in the first experimental example illustrated in FIG. 24 in which the stopper 15 was provided an electromotive force of about 45 V (18.3 micro joules of energy) was obtained. Specifically, an electromotive force of about two times as large and an energy of about three times as large as those in the case where the stopper 15 was not provided were obtained. From these results, it is clear that the power generation efficiency can be improved by providing a slippage suppression mechanism such as a stopper.

Reference Number List 1, 1a . . . piezoelectric power generator
10 . . . tire
10a . . . concave portion
11 . . . first elastic body
11b . . . protrusion
11b1 . . . surface of top of protrusion 11b
12 . . . power-generating element
13 . . . second elastic body
13a . . . fixing portion of second elastic body
13a1 . . . first fixing portion
13a2 . . . second fixing portion
13a3 . . . third fixing portion
13a4 . . . fourth fixing portion
13b . . . abutting portion
13b1 . . . R2-side end surface of abutting portion 13b
13c . . . slit
13d . . . curved portion
13f . . . surface portion of second elastic body 13 that abuts against top of protrusion 11b
14 . . . piezoelectric element
14a . . . piezoelectric body
14b . . . first electrode
14c . . . second electrode
15 . . . stopper
16 . . . terminal electrode
17 . . . adhesive tape
18 . . . slippage suppression mechanism
R . . . direction of rotation (first direction)

The invention claimed is:

1. A piezoelectric power generator comprising:
a first elastic body configured to deform along a first direction when subject to a stress;
a power-generating element, the power-generating element including:
a second elastic body having opposed first and second surfaces, a fixing portion of the first surface being fixed to the first elastic body;
an abutting portion positioned on one side in the first direction relative to the fixing portion, abutting against the first elastic body, and not fixed to the first elastic body;
a piezoelectric element attached to the second surface of the second elastic body; and
a slippage suppression mechanism provided on at least one of the first elastic body and the second elastic body, the slippage suppression mechanism configured to suppress slipping of the abutting portion with respect to the first elastic body when the first elastic body is deformed.

2. The piezoelectric power generator according to claim 1, wherein the abutting portion has an end surface facing the one side in the first direction and the slippage suppression mechanism is a stopper that is fixed to the first elastic body so as to be positioned on the one side in the first direction relative to the end surface of the abutting portion and that abuts against the end surface of the abutting portion when the first elastic body is deformed.

3. The piezoelectric power generator according to claim 2, wherein when a surface of the first elastic body is flat, a gap is formed between the stopper and the end surface of the abutting portion.

4. The piezoelectric power generator according to claim 1, wherein the slippage suppression mechanism is a rough surface on at least one of the abutting portion and the first elastic body.

5. The piezoelectric power generator according to claim 1, wherein the fixing portion is connected to an end portion of the abutting portion opposite to that of the slippage suppression mechanism.

6. The piezoelectric power generator according to claim 5, wherein the slippage suppression mechanism suppresses slipping of the end portion of the abutting portion.

7. The piezoelectric power generator according to claim 1, wherein the second elastic body is a single elastic plate, the fixing portion includes a first fixing portion arranged on a first side in the first direction with respect to the abutting portion, second and third fixing portions arranged at sides of the abutting portion, and a fourth fixing portion arranged on a second side in the first direction with respect to the abutting portion.

8. The piezoelectric power generator according to claim 7, wherein a slit in the elastic plate partitions the abutting portion and the second, third and fourth fixing portions from each other.

9. The piezoelectric power generator according to claim 7, wherein the stopper is part of the fourth fixing portion.

10. The piezoelectric power generator according to claim 1, wherein the first elastic body and the second elastic body are formed of a single elastic plate.

11. The piezoelectric power generator according to claim 1, wherein the first elastic body, the second elastic body, and the slippage suppression mechanism are formed of a single elastic plate.

12. The piezoelectric power generator according to claim 1, wherein the first elastic body is part of a tire.

13. The piezoelectric power generator according to claim 1, wherein the slippage suppression mechanism is integral with the first elastic body.

14. The piezoelectric power generator according to claim 13, wherein the slippage suppression mechanism is a protrusion from the first elastic body.

15. The piezoelectric power generator according to claim 13, wherein the slippage suppression mechanism is a concave portion within the first elastic body.

16. A power-generating element comprising:
an elastic body having first and second portions displaceable relative to each other upon the application of a stress;
a piezoelectric element attached to one of the first and second portions of the elastic body; and
a slippage suppression mechanism positioned so as to suppress slipping of one of the first and second portions of the elastic body upon the application of the stress.

17. The piezoelectric power generator according to claim 16, wherein the elastic body is a single elastic plate.

18. The piezoelectric power generator according to claim 17, wherein a slit in the single elastic plate partitions the first and second portions from each other.

19. The piezoelectric power generator according to claim 16, wherein the elastic body and the slippage suppression mechanism are formed of a single elastic plate.

20. The piezoelectric power generator according to claim 16, wherein the slippage suppression mechanism is integral with the elastic body.

* * * * *